(12) United States Patent
Asaka

(10) Patent No.: US 10,289,020 B2
(45) Date of Patent: May 14, 2019

(54) LASER SCANNING DEVICE CAPABLE OF DETECTING ABNORMAL STATE, IMAGE FORMING APPARATUS, ABNORMALITY DETECTION METHOD

(71) Applicant: KYOCERA Document Solutions Inc., Osaka-shi, Osaka (JP)

(72) Inventor: Hitoshi Asaka, Osaka (JP)

(73) Assignee: KYOCERA Document Solutions Inc., Osaka-shi, Osaka (JP)

(*) Notice: Subject to any disclaimer, the term of this patent is extended or adjusted under 35 U.S.C. 154(b) by 0 days.

(21) Appl. No.: 15/926,733

(22) Filed: Mar. 20, 2018

(65) Prior Publication Data

US 2018/0284680 A1    Oct. 4, 2018

(30) Foreign Application Priority Data

Mar. 30, 2017    (JP) .................... 2017-069066

(51) Int. Cl.
*G03G 15/04*        (2006.01)
*G02B 26/00*        (2006.01)
(Continued)

(52) U.S. Cl.
CPC ..... *G03G 15/04072* (2013.01); *G02B 26/122* (2013.01); *G03G 15/043* (2013.01);
(Continued)

(58) Field of Classification Search
CPC .......... G03G 15/04072; G03G 15/043; G03G 21/20; G03G 2215/0404; G02B 26/12;
(Continued)

(56) References Cited

U.S. PATENT DOCUMENTS 7,400,338 B2 * 7/2008 Yano .................. G02B 26/122
                                                          347/243
8,941,701 B2 * 1/2015 Hamada ................ G03G 21/20
                                                          347/133
(Continued)

FOREIGN PATENT DOCUMENTS

JP           10082965 A   *  3/1998
JP        2004025512 A       1/2004
(Continued)

OTHER PUBLICATIONS

European Patent Office, Extended European Search Report Issued in Application No. 18164259.6, dated Jul. 10, 2018, Germany, 7 pages.

*Primary Examiner* — Robert B Beatty
(74) *Attorney, Agent, or Firm* — Alleman Hall Creasman & Tuttle LLP

(57) ABSTRACT

A laser scanning device includes a light source, a rotary polytope, a motor, a bearing, and a detection processing portion. The rotary polytope scans light emitted from the light source. The motor rotates the rotary polytope. The bearing rotatably supports a rotation shaft of the motor. The detection processing portion, in a case where the motor is driven at a first speed that is higher than a predetermined reference speed, performs detection of an abnormal state based on an atmospheric temperature detected at a position located within a predetermined first range from the bearing, and in a case where the motor is driven at a second speed that is lower than the reference speed, does not perform the detection of the abnormal state, wherein the abnormal state is a state where the temperature of the bearing has exceeded a predetermined allowable temperature.

20 Claims, 5 Drawing Sheets

(51) Int. Cl.
  *G06K 15/00* (2006.01)
  *G06K 15/12* (2006.01)
  *G03G 15/043* (2006.01)
  *G03G 15/00* (2006.01)
  *G02B 26/12* (2006.01)

(52) U.S. Cl.
  CPC ......... *G03G 15/0409* (2013.01); *G03G 15/55* (2013.01); *G06K 15/1204* (2013.01); *G03G 2215/0404* (2013.01)

(58) Field of Classification Search
  CPC ............. G02B 26/122; G06K 15/1204; G06K 15/1219
  USPC ................................ 399/4, 44; 347/243, 261
  See application file for complete search history.

(56) References Cited

U.S. PATENT DOCUMENTS

| | | | |
|---|---|---|---|
| 9,298,160 | B1 | 3/2016 | Ogiwara et al. |
| 9,442,411 | B2 * | 9/2016 | Kato ................... G03G 15/043 |
| 9,772,491 | B2 * | 9/2017 | Shoji ................... G02B 26/127 |
| 2013/0222870 | A1 | 8/2013 | Iwami et al. |

FOREIGN PATENT DOCUMENTS

| | | | |
|---|---|---|---|
| JP | 2006126578 A | * | 5/2006 |
| JP | 2011043737 A | * | 3/2011 |
| JP | 2011123332 A | | 6/2011 |
| WO | 2004000562 A1 | | 12/2003 |

\* cited by examiner

LASER SCANNING DEVICE CAPABLE OF DETECTING ABNORMAL STATE, IMAGE FORMING APPARATUS, ABNORMALITY DETECTION METHOD

INCORPORATION BY REFERENCE

This application is based upon and claims the benefit of priority from the corresponding Japanese Patent Application No. 2017-069066 filed on Mar. 30, 2017, the entire contents of which are incorporated herein by reference.

BACKGROUND

The present disclosure relates to a laser scanning device mounted in an image forming apparatus of an electrophotographic system, an image forming apparatus, and an abnormality detection method executed in a laser scanning device.

In an image forming apparatus capable of forming an image by an electrophotographic system, light emitted from a light source is scanned on an image carrier such as a photoconductor drum by a rotary polytope. On the other hand, there is known a print control device that can suspend a print process in execution or prohibit an execution of a print process when a temperature of a print head detected by a temperature sensor exceeds a predetermined temperature.

SUMMARY

A laser scanning device according to an aspect of the present disclosure includes a light source, a rotary polytope, a motor, a bearing, and a detection processing portion. The rotary polytope scans light emitted from the light source. The motor rotates the rotary polytope. The bearing rotatably supports a rotation shaft of the motor. The detection processing portion, in a case where the motor is driven at a first speed that is higher than a predetermined reference speed, performs detection of an abnormal state based on an atmospheric temperature detected at a position located within a predetermined first range from the bearing, and in a case where the motor is driven at a second speed that is lower than the reference speed, does not perform the detection of the abnormal state, wherein the abnormal state is a state where the temperature of the bearing has exceeded a predetermined allowable temperature.

An image forming apparatus according to another aspect of the present disclosure includes the laser scanning device.

An abnormality detection method according to a further aspect of the present disclosure is executed in a laser scanning device that includes a light source, a rotary polytope configured to scan light emitted from the light source, a motor configured to rotate the rotary polytope, and a bearing rotatably supporting a rotation shaft of the motor. The abnormality detection method includes: in a case where the motor is driven at a first speed that is higher than a predetermined reference speed, performing detection of an abnormal state, based on an atmospheric temperature detected at a position located within a predetermined first range from the bearing, and in a case where the motor is driven at a second speed that is lower than the reference speed, not performing the detection of the abnormal state, wherein the abnormal state is a state where the temperature of the bearing has exceeded a predetermined allowable temperature.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The following describes an embodiment of the present disclosure with reference to the accompanying drawings for the understanding of the present disclosure. It should be noted that the following embodiment is an example of a specific embodiment of the present disclosure and should not limit the technical scope of the present disclosure.

[Outlined Configuration of Image Forming Apparatus 10]

First, an outlined configuration of an image forming apparatus 10 according to an embodiment of the present disclosure is described with reference to FIG. 1 and FIG. 2. Here, FIG. 1 is a schematic cross-sectional diagram showing the configuration of the image forming apparatus 10.

The image forming apparatus 10 is a multifunction peripheral having a plurality of functions such as a scan function for reading image data from a document sheet, a print function for forming an image based on image data, a facsimile function, and a copy function. It is noted that the present disclosure is applicable to image forming apparatuses such as a printer apparatus, a facsimile apparatus, and a copier.

Figure 1:
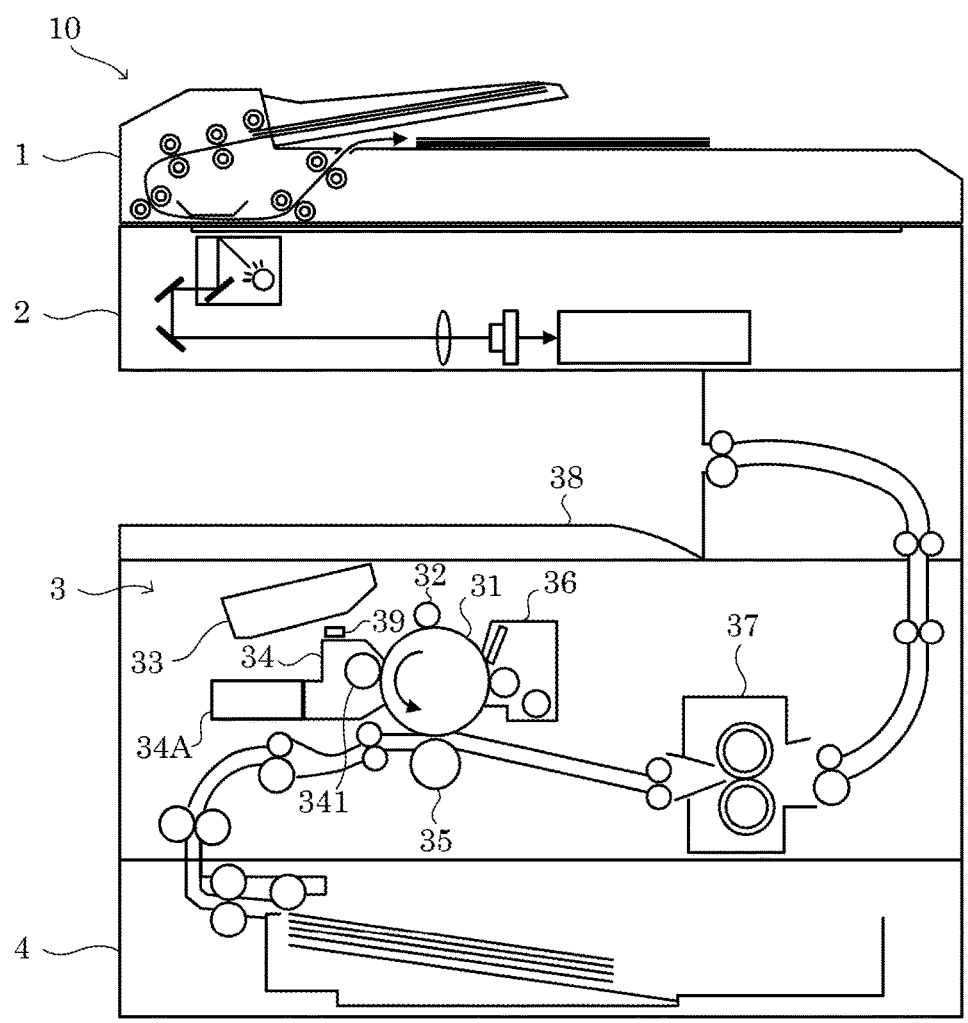
FIG. 1 is a diagram showing a configuration of an image forming apparatus according to an embodiment of the present disclosure.
Figure 2:
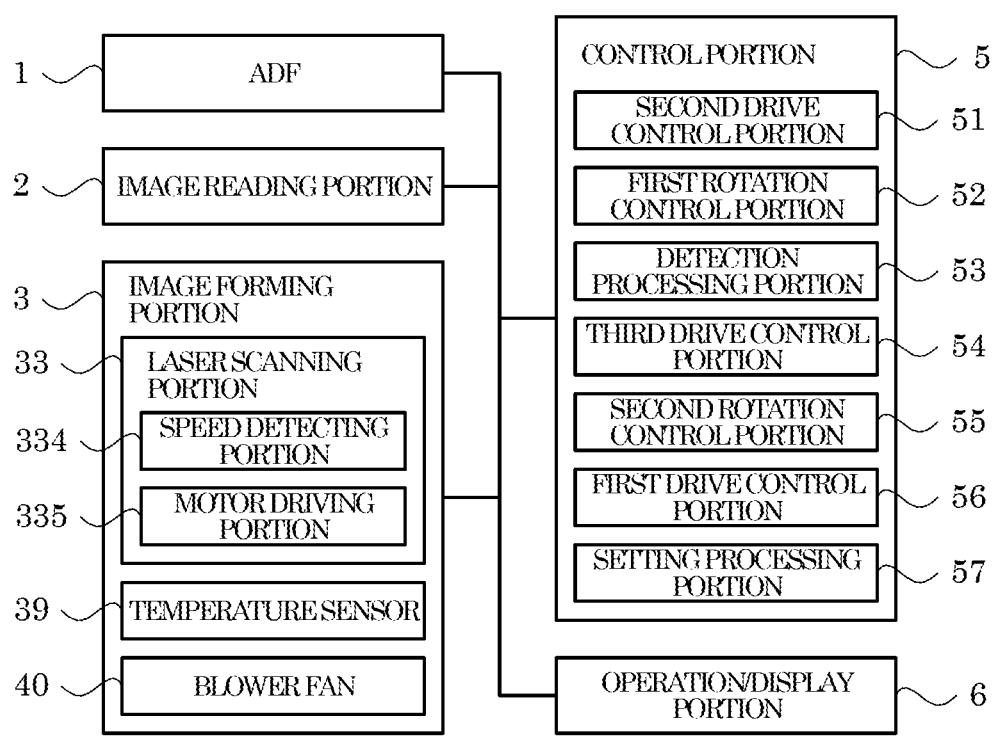
FIG. 2 is a block diagram showing a system configuration of the image forming apparatus according to the embodiment of the present disclosure.

As shown in FIG. 1 and FIG. 2, the image forming apparatus 10 includes an ADF 1, an image reading portion 2, an image forming portion 3, a sheet feed portion 4, a control portion 5, and an operation/display portion 6.

The ADF 1 is an automatic document feeding device that includes a document sheet setting portion, a plurality of conveyance rollers, a document sheet pressing, and a sheet discharge portion, and conveys a document sheet so that it is read by the image reading portion 2. The image reading portion 2 includes a document sheet table, a light source, a plurality of mirrors, an optical lens, and a CCD (Charge Coupled Device), and is configured to read image data from a document sheet.

The image forming portion 3 is configured to form an image by the electrophotographic system based on image data read by the image reading portion 2, or image data input from an external information processing apparatus such as a personal computer. Specifically, as shown in FIG. 1, the image forming portion 3 includes a photoconductor drum 31, a charging member 32, a laser scanning portion 33, a developing portion 34, a transfer roller 35, a cleaning device 36, a fixing device 37, and a sheet discharge tray 38. Here, the photoconductor drum 31 is an example of the image carrier of the present disclosure.

An electrostatic latent image is formed on the photoconductor drum 31. The charging member 32, upon receiving an application of a voltage, charges the surface of the photoconductor drum 31. The laser scanning portion 33 forms the electrostatic latent image corresponding to image data on the photoconductor drum 31 by scanning light on the photoconductor drum 31 in correspondence with the image data. The developing portion 34 develops the electrostatic latent image formed on the photoconductor drum 31. The developing portion 34 includes a developing roller 341 (see FIG. 1) which, upon receiving an application of a voltage, supplies toner to the photoconductor drum 31. The transfer roller 35, upon receiving an application of a voltage, transfers the toner image formed on the surface of the photoconductor drum 31, to a sheet. The cleaning device 36 cleans the surface of the photoconductor drum 31 after the transfer of the toner image by the transfer roller 35. The fixing device 37 heats the sheet with the toner image transferred thereto, and thereby fixes the toner image to the sheet. The sheet with the toner image fixed thereto is discharged onto the sheet discharge tray 38.

The sheet feed portion 4 includes a sheet feed cassette and a plurality of conveyance rollers, and supplies sheets stored in the sheet feed cassette, to the image forming portion 3 one by one. It is noted that the sheet is a sheet-like material such as a sheet of paper, a sheet of coated paper, a postcard, an envelope, or an OHP sheet.

In the image forming portion 3, an image is formed in the following procedure on a sheet supplied from the sheet feed portion 4, and the sheet with the image formed thereon is discharged to the sheet discharge tray 38.

First, the charging member 32 uniformly charges the surface of the photoconductor drum 31 to a certain potential. Next, the laser scanning portion 33 irradiates light on the surface of the photoconductor drum 31 based on the image data. This allows an electrostatic latent image corresponding to the image data to be formed on the surface of the photoconductor drum 31. The electrostatic latent image on the photoconductor drum 31 is developed (visualized) as a toner image by the developing portion 34. It is noted that toner (developer) is replenished to the developing portion 34 from a toner container 34A that is attached to the image forming portion 3 in a detachable manner.

Subsequently, the toner image formed on the photoconductor drum 31 is transferred to the sheet by the transfer roller 35. Thereafter, the sheet is heated by the fixing device 37, and the toner image transferred to the sheet is fused and fixed to the sheet. It is noted that the toner that has remained on the surface of the photoconductor drum 31 is removed by the cleaning device 36.

The control portion 5 includes control equipment such as CPU, ROM, RAM, and EEPROM that are not shown. The CPU is a processor that executes various calculation processes. The ROM is a nonvolatile storage device in which various information such as control programs for causing the CPU to execute various processes are stored in advance. The RAM is a volatile storage device, and is used as a temporary storage memory (working area) for the various processes executed by the CPU. The EEPROM is a nonvolatile storage device. In the control portion 5, the CPU executes the various control programs stored in advance in the ROM. This allows the image forming apparatus 10 to be controlled comprehensively by the control portion 5. It is noted that the control portion 5 may be formed as an electronic circuit such as an integrated circuit (ASIC), and may be a control portion provided independently of a main control portion that comprehensively controls the image forming apparatus 10.

The operation/display portion 6 includes a display portion and an operation portion, wherein the display portion is a liquid crystal display or the like and displays various types of information in response to control instructions from the control portion 5, and the operation portion is, for example, operation keys or a touch panel that inputs various types of information to the control portion 5 in response to user operations.

[Configuration of Laser Scanning Portion 33]

Figure 3:
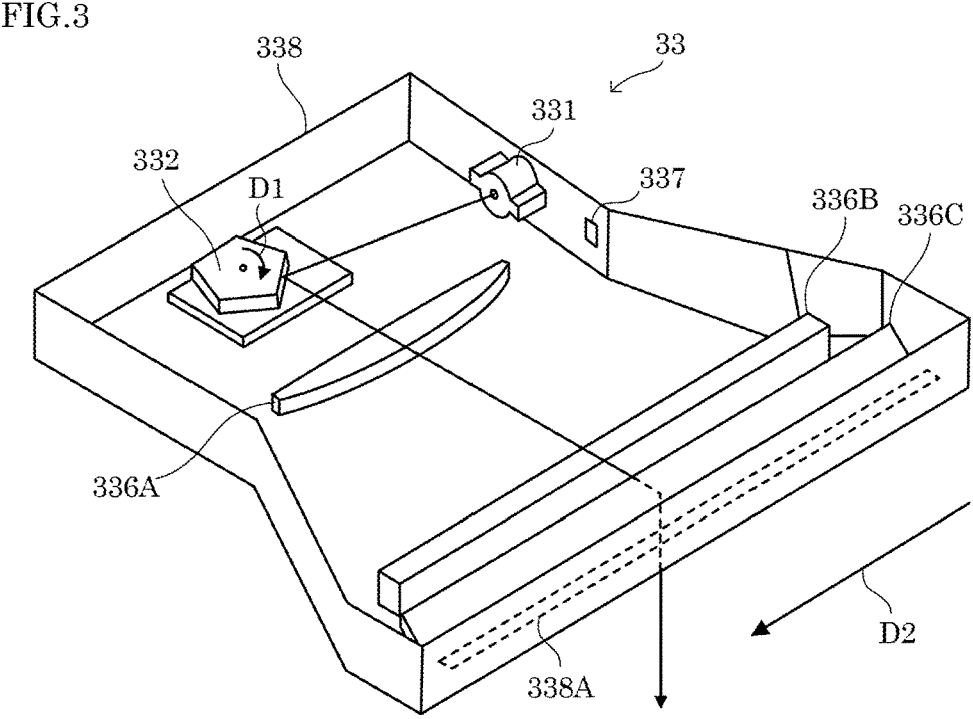
FIG. 3 is a diagram showing a configuration of a laser scanning portion of the image forming apparatus according to the embodiment of the present disclosure.

Next, the laser scanning portion 33 is described with reference to FIG. 2 to FIG. 4. Here, FIG. 3 is a perspective view showing a configuration of the laser scanning portion 33. In addition, FIG. 4 is a schematic cross-sectional view showing a configuration of a motor 333.

Figure 4:
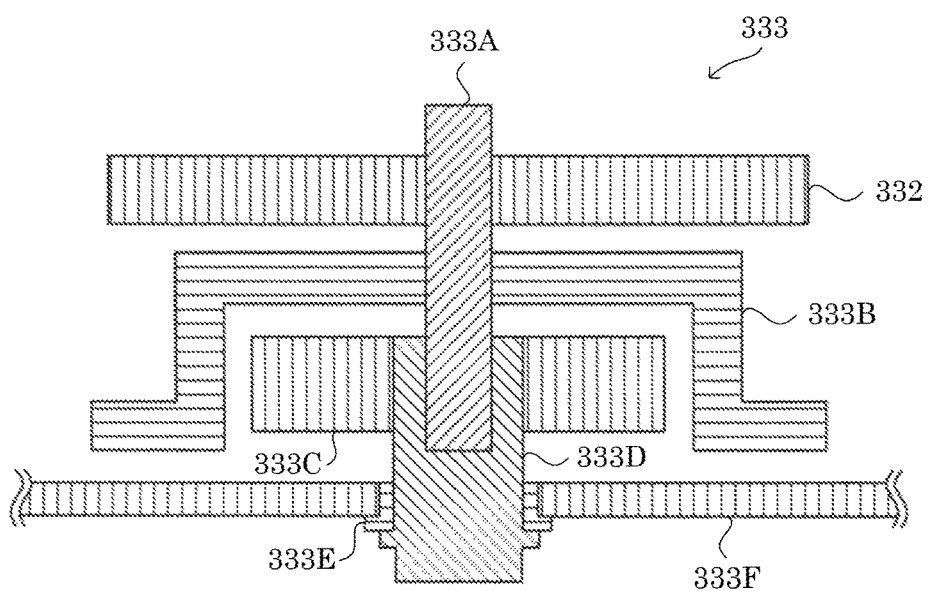
FIG. 4 is a diagram showing a configuration of a motor of the image forming apparatus according to the embodiment of the present disclosure.

As shown in FIG. 2 to FIG. 4, the laser scanning portion 33 includes a light source 331, a polygon mirror 332, the motor 333, a speed detecting portion 334, a motor driving portion 335, fθ lenses 336A to 336B, a total reflection mirror 336C, a light sensor 337, a housing 338 that stores these components, and a light-emitting port 338A formed in the housing 338. It is noted that in the image forming portion 3, the laser scanning portion 33 is disposed at a position above the photoconductor drum 31 where a longitudinal direction of the light-emitting port 338A and an axial direction of the photoconductor drum 31 are parallel to each other.

The light source 331 emits light in correspondence with image data. For example, the light source 331 is a laser diode.

The polygon mirror 332 is configured to scan light emitted from the light source 331. For example, as shown in FIG. 3, the polygon mirror 332 is regular pentagonal in a plan view and includes a plurality of reflection surfaces that reflect light emitted from the light source 331.

The polygon mirror 332 rotates in a rotation direction D1 shown in FIG. 3 by a rotational driving force supplied from the motor 333. With this configuration, light beams are scanned by the reflection surfaces in sequence as the polygon mirror 332 rotates. Here, the polygon mirror 332 is an example of the rotary polytope of the present disclosure.

The motor 333 causes the polygon mirror 332 to rotate by supplying the rotational driving force to the polygon mirror 332. For example, the motor 333 is a DC brushless motor.

Specifically, as shown in FIG. 4, the motor 333 includes a rotation shaft 333A, a rotor 333B, a stator 333C, and a bearing 333D. The motor 333 is attached to a substrate 333F when the bearing 333D is fixed to the substrate 333F via a fixing member 333E.

The rotation shaft 333A is a drive shaft of the motor 333. The rotor 333B and the polygon mirror 332 are fixed to the rotation shaft 333A, wherein the rotor 333B includes a permanent magnet. The bearing 333D is a fluid dynamic bearing that rotatably supports the rotation shaft 333A via a lubricant such as oil. The stator 333C includes an electromagnet that is excited by a drive voltage applied from the motor driving portion 335. The stator 333C is fixed to the bearing 333D.

In the motor 333, the rotor 333B rotates around the rotation shaft 333A by an interaction between the rotor 333B and the stator 333C. This allows the polygon mirror 332 to rotate around the rotation shaft 333A. It is noted that the rotor 333B may include an electromagnet, and the stator 333C may include a permanent magnet.

The speed detecting portion 334 detects a rotational speed of the motor 333. For example, the speed detecting portion 334 is a rotary encoder attached to the rotation shaft 333A of the motor 333. The speed detecting portion 334 outputs, to the motor driving portion 335, an electric signal with a frequency corresponding to the rotational speed of the motor 333.

The motor driving portion 335 is a drive circuit that drives the motor 333 by applying a driving voltage to the motor 333. Specifically, the motor driving portion 335 rotates the motor 333 at a speed corresponding to the frequency of the drive signal input from the control portion 5. For example, the motor driving portion 335 causes the motor 333 to rotate at a speed corresponding to the frequency of the drive signal, by performing a PLL control based on the electric signal output from the speed detecting portion 334 and the drive signal input from the control portion 5.

The fθ lenses 336A to 336B convert light beams that are scanned at an equal angular speed by the polygon mirror 332, to light beams that are scanned at an equal speed along a scanning direction D2 (see FIG. 3). The total reflection mirror 336C reflects light that has passed through the fθ lens 336B, toward the surface of the photoconductor drum 31. The light-emitting port 338A includes an elongated opening and a transparent glass plate or acrylic plate, wherein the light reflected by the total reflection mirror 336C is emitted through the opening toward the surface of the photoconductor drum 31, and the glass plate or the acrylic plate closes the opening.

The light sensor 337 detects a light beam scanned by the polygon mirror 332, at a predetermined detection position in a scanning area in which the polygon mirror 332 scans light beams. For example, the light sensor 337 is an electronic circuit including a photodiode. For example, the detection position is located on the upstream side in the scanning direction D2, so as not to be reflected by the total reflection mirror 336C. The light sensor 337 outputs a detection signal, upon detecting a light beam scanned by the polygon mirror 332.

The detection signal output from the light sensor 337 is input to the control portion 5. Based on the input timing of the detection signal, the control portion 5 determines a timing for the light source 331 to emit light in correspondence with one line of the image data, namely, a timing to write an electrostatic latent image in the scanning direction D2.

Meanwhile, in the image forming apparatus 10, when the motor 333 is driven at a high speed, the bearing 333D of the motor 333 may have a high temperature. When the bearing 333D continues to have a high temperature, a malfunction may be generated. For example, the substrate 333F may be deformed and the attachment position of the polygon mirror 332 may be shifted. As a countermeasure for this problem, a temperature sensor may be used to detect an abnormal temperature of the bearing 333D, and upon detection of an abnormal temperature, the driving of the motor 333 may be stopped. Here, in a case where an abnormal temperature of the bearing 333D is detected based on the temperature of the bearing 333D, the position of the temperature sensor used to detect the abnormal temperature of the bearing 333D is restricted to a proximity of the bearing 333D.

On the other hand, in the image forming apparatus 10 according to the embodiment of the present disclosure, it is possible to improve the degree of freedom in arrangement position of the temperature sensor that is used to detect the abnormal temperature of the bearing 333D, as described below.

Specifically, an abnormality detection program for causing the CPU to execute an abnormality detection process (see the flowchart of FIG. 5) is stored in advance in the ROM of the control portion 5. It is noted that the abnormality detection program may be recorded on a computer-readable recording medium such as a CD, a DVD, or a flash memory, and may be installed from the recording medium to a storage device, such as the EEPROM, of the control portion 5.

As shown in FIG. 2, the control portion 5 includes a second drive control portion 51, a first rotation control portion 52, a detection processing portion 53, a third drive control portion 54, a second rotation control portion 55, a first drive control portion 56, and a setting processing portion 57. Specifically, the control portion 5 executes the abnormality detection program stored in the ROM by using the CPU. This allows the control portion 5 to function as the second drive control portion 51, the first rotation control portion 52, the detection processing portion 53, the third drive control portion 54, the second rotation control portion 55, the first drive control portion 56, and the setting processing portion 57. Here, a device that includes the laser scanning portion 33 and the control portion 5 is an example of the laser scanning device of the present disclosure.

The second drive control portion 51 drives the motor 333 when a print process for forming an image on a sheet is executed.

For example, the second drive control portion 51 drives the motor 333 at a speed that corresponds to a set print mode. For example, the print mode includes a high-quality image mode and a normal mode, wherein in the high-quality image mode, the print process is executed while the motor 333 is rotated at a predetermined first drive speed, and in the normal mode, the print process is executed while the motor 333 is rotated at a predetermined second drive speed that is lower than the first drive speed. The control portion 5 sets the print mode in accordance with a user operation performed on the operation/display portion 6. In addition, in a case where the print process is executed based on print data transmitted from an external information processing apparatus, the control portion 5 sets the print mode based on a print condition included in the print data. It is noted that in the high-quality image mode, a print with a higher resolution is output than in the normal mode.

Specifically, the second drive control portion 51 inputs, to the motor driving portion 335, a drive signal with a frequency corresponding to the first drive speed or the second drive speed so as to cause the motor 333 to be driven at the first drive speed or the second drive speed.

It is noted that the print mode may include a plurality of modes that respectively correspond to three or more predetermined speeds.

The first rotation control portion 52 rotates a blower fan 40 (see FIG. 2) at a predetermined third speed.

Here, the blower fan 40 generates an airflow that moves along an outer surface of the housing 338 of the laser scanning portion 33. For example, the blower fan 40 is provided at an air supply port (not shown) formed in a side surface of a housing of the image forming apparatus 10, and blows air toward the interior of the housing. The airflow generated by the blower fan 40 passes through an air passage formed by a duct (not shown) and an outer surface of the housing 338, and is thereby guided to an air discharge port (not shown) formed in a side surface of the housing.

Specifically, the first rotation control portion 52 rotates the blower fan 40 at the third speed when the print process is executed.

In a case where the motor 333 is driven at a first speed that is higher than a predetermined reference speed, the detection processing portion 53 performs detection of an abnormal state, based on an atmospheric temperature detected at a position located within a predetermined first range from the bearing 333D, wherein the abnormal state is a state where the temperature of the bearing 333D has exceeded a predetermined allowable temperature. On the other hand, in a case where the motor 333 is driven at a second speed that is lower than the reference speed, the detection processing portion 53 does not perform detection of the abnormal state.

That is, in the image forming apparatus 10, the detection of the abnormal state is performed based on the ambient temperature of the bearing 333D and the rotation state of the motor 333 instead of the temperature of the bearing 333D. With this configuration, it is possible to arrange a temperature sensor 39 (see FIG. 2) that is described below, at a position separate from the bearing 333D.

In addition, in the image forming apparatus 10, the period for performing detection of the abnormal state is limited to a time period in which the motor 333 is driven at a speed higher than the reference speed, by taking into consideration that the abnormal state is more difficult to occur when the driving speed of the motor 333 is lower, and that the rise of the temperature of the bearing 333D toward the allowable temperature affects a smaller range when the driving speed of the motor 333 is lower. With this configuration, compared to a configuration where the time period for performing the detection of the abnormal state is not limited to a certain time period, it is possible to increase the distance between the bearing 333D and the temperature sensor 39.

For example, the reference speed is the highest speed among the speeds at which the motor 333 is driven while the temperature of the bearing 333D does not exceed the allowable temperature, in a case where a predetermined number of prints are printed in the image forming apparatus 10 that is installed under a predetermined environmental condition. Here, the first drive speed for the high-quality image mode is higher than the reference speed. In addition, the second drive speed for the normal mode is lower than the reference speed. That is, the first drive speed is an example of the first speed. In addition, the second drive speed is an example of the second speed.

In addition, the first range is a range in which affected by the heat generated at the bearing 333D, the atmospheric temperature rises exceeding a predetermined value in a case where the motor 333 is driven at the first speed and the temperature of the bearing 333D rises toward the allowable temperature.

Here, in the image forming apparatus 10, the temperature sensor 39 (see FIG. 2) for detecting the temperature (atmospheric temperature) at a position where the temperature sensor 39 is disposed is provided within the first range. For example, the temperature sensor 39 is a thermister in which electric resistance thereof changes in accordance with atmospheric temperature. The detection processing portion 53 performs detection of the abnormal state based on the temperature detected by the temperature sensor 39.

For example, the detection processing portion 53 detects the abnormal state when the temperature detected by the temperature sensor 39 exceeds a predetermined first threshold. For example, the first threshold is a temperature detected by the temperature sensor 39 in a case where the temperature of the bearing 333D exceeds the allowable temperature when the motor 333 is driven at the first speed.

It is noted that the detection processing portion 53 may detect the abnormal state when a temperature rise rate of a temperature detected at a position located within the first range from the bearing 333D exceeds a predetermined second threshold. For example, the second threshold is a temperature rise rate calculated based on temperatures detected by the temperature sensor 39 after the temperature of the bearing 333D exceeds the allowable temperature when the motor 333 is driven at the first speed.

The third drive control portion 54 is configured to change the driving speed of the motor 333 from the first speed to the second speed in a case where the detection processing portion 53 has detected the abnormal state.

For example, the third drive control portion 54 changes the driving speed of the motor 333 to the second speed in accordance with a user operation received after the detection processing portion 53 has detected the abnormal state.

It is noted that in the image forming apparatus 10, the function of the third drive control portion 54 to change the driving speed of the motor 333 may be validated or invalidated in accordance with a user operation performed on the operation/display portion 6. In addition, in a case where the detection processing portion 53 has detected the abnormal state, the third drive control portion 54 may change the driving speed of the motor 333 from the first speed to the second speed without receiving a user operation. In addition, the control portion 5 may not include the third drive control portion 54.

The second rotation control portion 55 is configured to rotate the blower fan 40 at a fourth speed that is higher than the third speed in a case where the detection processing portion 53 has detected the abnormal state.

It is noted that the second rotation control portion 55 may not include the second rotation control portion 55.

The first drive control portion 56 is configured to, in a case where the detection processing portion 53 has detected the abnormal state, stop the driving of the motor 333 until a predetermined condition for resuming the driving is satisfied.

Specifically, the first drive control portion 56 stops the driving of the motor 333 in a case where the driving speed of the motor 333 is not changed to the second speed by the third drive control portion 54. In addition, in a case where the detection processing portion 53 has detected the abnormal state, the first drive control portion 56 stops the driving of the motor 333 after at least one print is output.

For example, the condition for resuming the driving is that a predetermined wait time elapses since the driving of the motor 333 is stopped. In addition, the condition for resuming the driving may be that the temperature detected by the temperature sensor 39 becomes lower than a predetermined temperature.

In addition, when a predetermined stop condition is satisfied after the third drive control portion 54 changes the driving speed of the motor 333, the first drive control portion 56 stops the driving of the motor 333. For example, the stop condition is that a temperature detected by the temperature sensor 39 after a predetermined specific time period elapses since a change of the driving speed of the motor 333 by the third drive control portion 54, is higher than a temperature that is obtained by subtracting a predetermined third threshold from a temperature detected by the temperature sensor 39 when the driving speed of the motor 333 was changed. In addition, the stop condition may be that a temperature lowering rate calculated based on temperatures detected by the temperature sensor 39 during the time period from a change of the driving speed of the motor 333 to an elapse of the specific time period, is lower than a predetermined value.

It is noted that in a case where the control portion 5 does not include the third drive control portion 54, when the detection processing portion 53 has detected the abnormal state, the first drive control portion 56 may stop the driving of the motor 333. In addition, when the detection processing portion 53 has detected the abnormal state, the first drive control portion 56 may stop the driving of the motor 333 before a print is output.

In addition, the control portion 5 may not include the first drive control portion 56. In that case, when the detection processing portion 53 has detected the abnormal state, the third drive control portion 54 may change the driving speed of the motor 333 from the first speed to the second speed.

The setting processing portion 57 sets a developing bias voltage to be applied to the developing roller 341 of the developing portion 34, based on a temperature detected by the temperature sensor 39. That is, in the image forming apparatus 10, the temperature sensor 39 is used for two purposes: to detect the abnormal state; and to set the developing bias voltage.

Specifically, in the image forming apparatus 10, the temperature sensor 39 is disposed at a position located within the first range from the bearing 333D and between the laser scanning portion 33 and the developing portion 34. For example, as shown in FIG. 1, the temperature sensor 39 is provided on an outer surface of the developing portion 34 facing the laser scanning portion 33. With this configuration, in the image forming apparatus 10, the temperature sensor 39 can detect an ambient temperature of the developing portion 34. It is noted that the temperature sensor 39 may be provided in the interior of the housing 338 of the laser scanning portion 33.

In addition, in the image forming apparatus 10, table data is stored in the EEPROM of the control portion 5, wherein temperatures detected by the temperature sensor 39 are associated with developing bias voltages in the table data. For example, when the print process is executed, the setting processing portion 57 sets the developing bias voltage based on a temperature detected by the temperature sensor 39 and the table data.

It is noted that the setting processing portion 57 may set a voltage to be applied to the charging member 32 and a voltage to be applied to the transfer roller 35, together with the developing bias voltage, based on a temperature detected by the temperature sensor 39. In addition, the control portion 5 may not include the setting processing portion 57.

[Abnormality Detection Process]

Figure 5:
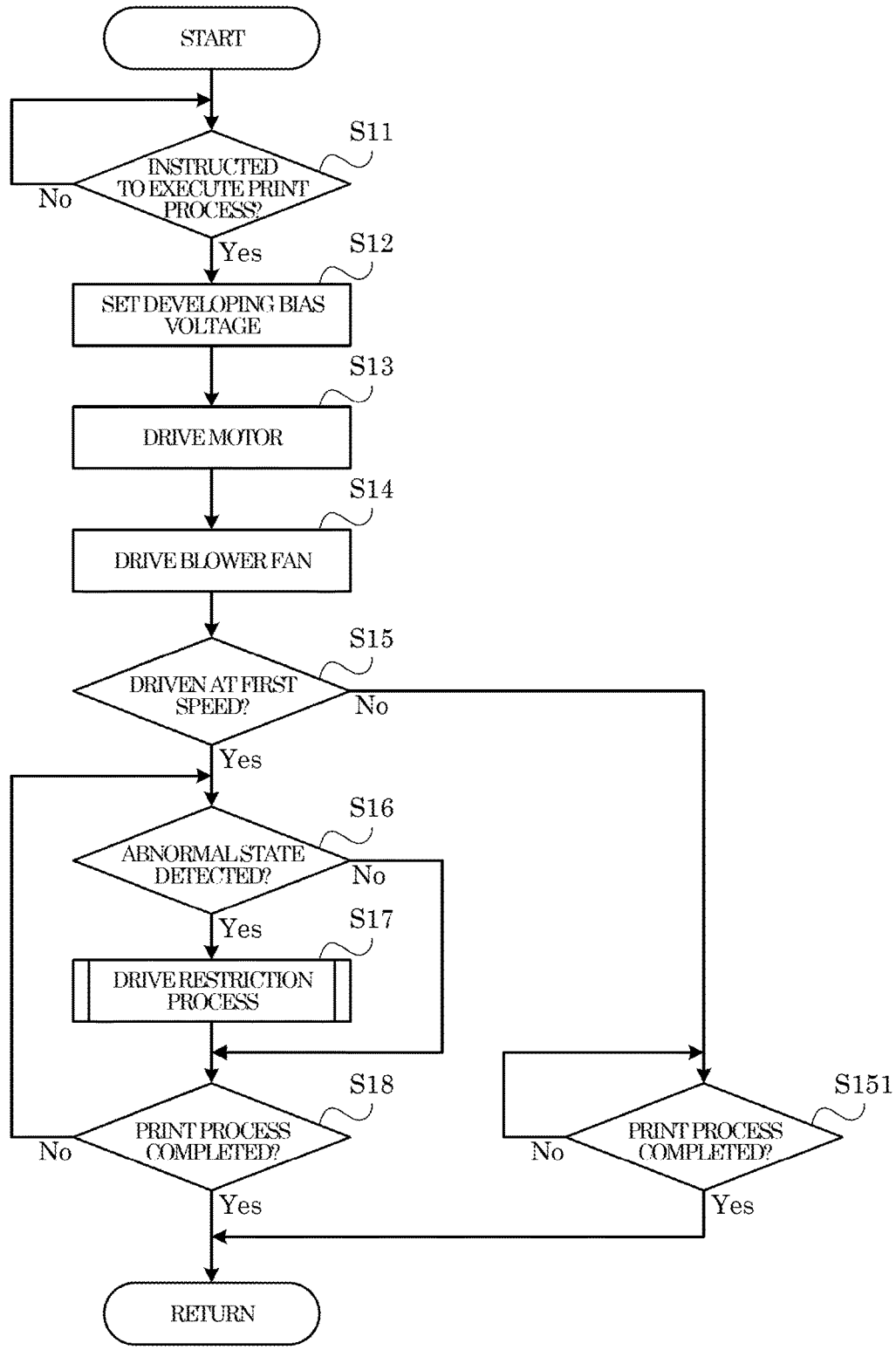
FIG. 5 is a flowchart showing an example of an abnormality detection process executed in the image forming apparatus according to the embodiment of the present disclosure.

In the following, with reference to FIG. 5, a description is given of an example of the procedure of the abnormality detection process executed by the control portion 5 in the image forming apparatus 10. Here, steps S11, S12, . . . represent numbers assigned to the processing procedures (steps) executed by the control portion 5.

<Step S11>

In step S11, the control portion 5 determines whether or not an instruction to execute the print process has been input.

Specifically, when a user operation instructing to execute the print process has been performed on the operation/display portion 6, the control portion 5 determines that an instruction to execute the print process has been input. In addition, when print data transmitted from an external information processing apparatus has been received, the control portion 5 determines that an instruction to execute the print process has been input.

Here, upon determining that an instruction to execute the print process has been input (Yes side at S11), the control portion 5 moves the process to step S12. In addition, upon determining that an instruction to execute the print process has been not input (No side at S11), the control portion 5 waits for an instruction to execute the print process to be input at step S11.

<Step S12>

In step S12, the control portion 5 sets a developing bias voltage to be applied to the developing roller 341 of the developing portion 34, based on a temperature detected by the temperature sensor 39. Here, the process of step S12 is executed by the setting processing portion 57 of the control portion 5.

Specifically, the control portion 5 sets the developing bias voltage based on a temperature detected by the temperature sensor 39 and the table data stored in the EEPROM. It is noted that the control portion 5 may set a voltage to be applied to the charging member 32 and a voltage to be applied to the transfer roller 35, together with the developing bias voltage. In addition, the process of step S12 may be omitted in the abnormality detection process.

<Step S13>

In step S13, the control portion 5 drives the motor 333. Here, the process of step S13 is executed by the second drive control portion 51 of the control portion 5.

Specifically, the control portion 5 drives the motor 333 at a drive speed (the first drive speed or the second drive speed) that corresponds to a print mode set in accordance with a user operation performed on the operation/display portion 6, or corresponds to a print mode set based on the print condition included in the print data.

<Step S14>

In step S14, the control portion 5 rotates the blower fan 40 at the third speed. Here, the process of step S14 is executed by the first rotation control portion 52 of the control portion 5.

<Step S15>

In step S15, the control portion 5 determines whether or not the motor 333 is driven at the first speed.

For example, the control portion 5 determines that the motor 333 is driven at the first speed in a case where the high-quality image mode has been set as the print mode in accordance with a user operation performed on the operation/display portion 6, or based on the print condition included in the print data.

Here, upon determining that the motor 333 is driven at the first speed (Yes side at S15), the control portion 5 moves the process to step S16. In addition, upon determining that the motor 333 is not driven at the first speed (No side at S15), the control portion 5 moves the process to step S151.

<Step S151>

In step S151, the control portion 5 determines whether or not the print process for which the execution instruction was input in step S11 has been completed.

Here, upon determining that the print process has been completed (Yes side at S151), the control portion 5 moves the process to step S11. In addition, upon determining that the print process has not been completed (No side at S151), the control portion 5 waits for the print process to be completed at step S151.

<Step S16>

In step S16, the control portion 5 performs detection of the abnormal state based on an atmospheric temperature detected at a position located within the first range from the bearing 333D, wherein the abnormal state is a state where the temperature of the bearing 333D has exceeded the allowable temperature. Here, the processes of steps S15 to S16 are executed by the detection processing portion 53 of the control portion 5.

Specifically, the control portion 5 detects the abnormal state when a temperature detected by the temperature sensor 39 has exceeded the first threshold.

Here, upon detecting the abnormal state (Yes side at S16), the control portion 5 moves the process to step S17. In addition, upon not detecting the abnormal state (No side at S16), the control portion 5 moves the process to step S18.

<Step S17>

In step S17, the control portion 5 executes a drive restriction process that is described below.

<Step S18>

In step S18, the control portion 5 determines whether or not the print process for which the execution instruction was input in step S11 has been completed.

Here, upon determining that the print process has been completed (Yes side at S18), the control portion 5 moves the process to step S11. In addition, upon determining that the print process has not been completed (No side at S18), the control portion 5 moves the process to step S16, and waits for the abnormal state to be detected, until the print process is completed.

[Drive Restriction Process]

Figure 6:
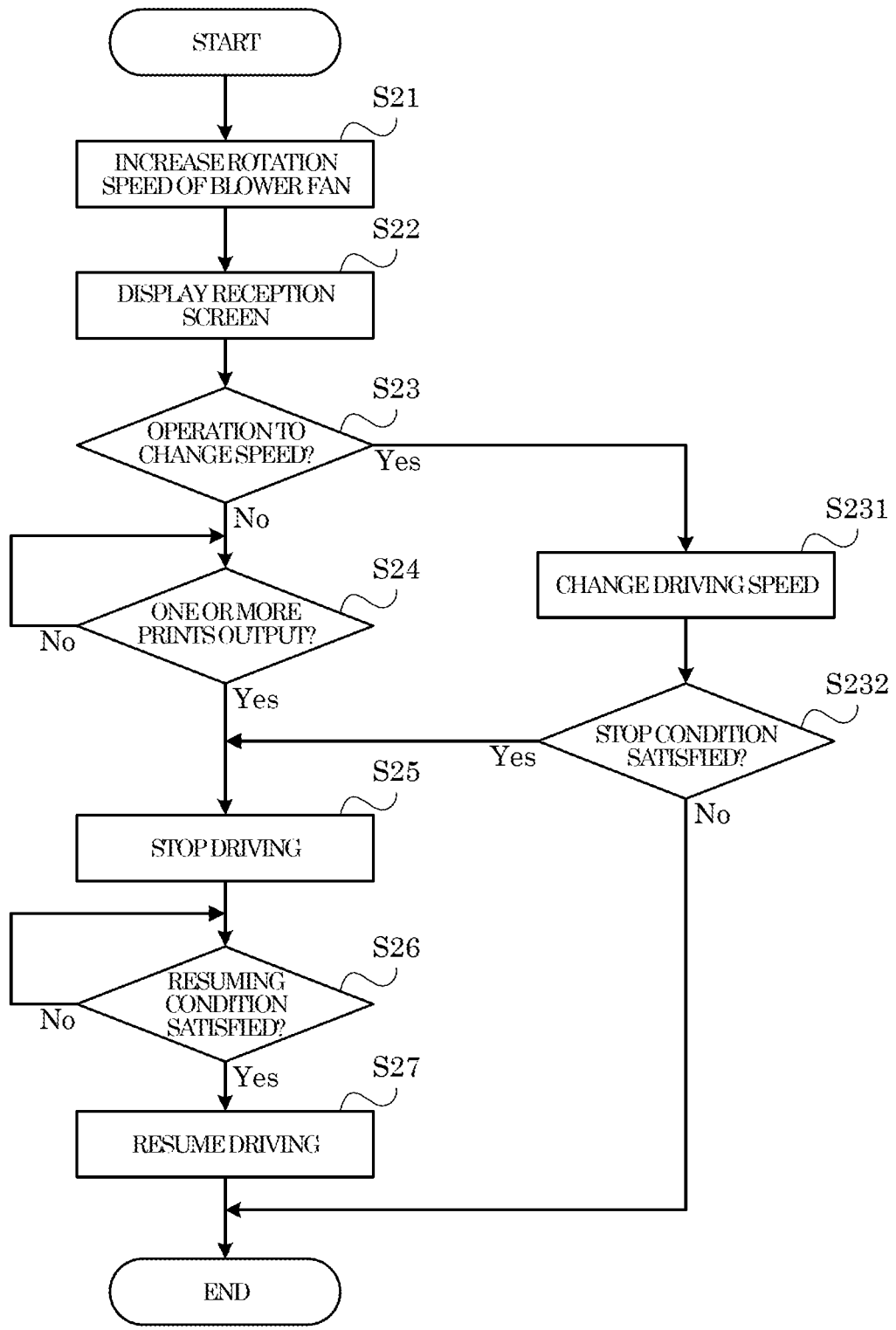
FIG. 6 is a flowchart showing an example of a drive restriction process executed in the image forming apparatus according to the embodiment of the present disclosure.

Next, with reference to FIG. 6, a description is given of an example of the procedure of the drive restriction process executed in step S17 of the abnormality detection process.

<Step S21>

In step S21, the control portion 5 rotates the blower fan 40 at the fourth speed that is higher than the third speed. Here, the process of step S21 is executed by the second rotation control portion 55 of the control portion 5.

This accelerates the temperature reduction in the housing 338 of the laser scanning portion 33. As a result, the temperature reduction of the bearing 333D stored in the housing 338 is accelerated, and the abnormal state is eliminated. It is noted that in the drive restriction process, the process of step S21 may be omitted.

<Step S22>

In step S22, the control portion 5 displays, on the operation/display portion 6, a reception screen for receiving an operation instructing to change the driving speed of the motor 333. This allows the user to select whether to continue the print process by decreasing the driving speed of the motor 333, or to suspend the print process. In particular, in the case of the image forming apparatus 10 in which the image quality of the print may be degraded by changing the driving speed of the motor 333, it is possible to avoid a print with a degraded image quality from being output against the user's will.

<Step S23>

In step S23, the control portion 5 determines whether or not an operation instructing to change the driving speed of the motor 333 has been received on the reception screen displayed on the operation/display portion 6 in step S22.

Here, upon determining that an operation instructing to change the driving speed of the motor 333 has been received on the reception screen (Yes side at S23), the control portion 5 moves the process to step S231. In addition, upon determining that an operation instructing to change the driving speed of the motor 333 has not been received on the reception screen (No side at S23), the control portion 5 moves the process to step S24.

<Step S231>

In step S231, the control portion 5 changes the driving speed of the motor 333 to the second speed. Here, the processes of steps S22, S23 and S231 are executed by the third drive control portion 54 of the control portion 5.

This restricts the temperature rise of the bearing 333D. For example, in the image forming apparatus 10, when the abnormal state is detected, the driving speed of the motor 333 is changed from the first speed to the second speed. This allows the temperature of the bearing 333D to converge to a temperature lower than the allowable temperature. As a result, it is possible to realize both elimination of the abnormal state and continuation of execution of the print process. It is noted that the second speed is preferably the lowest speed among a plurality of predetermined driving speeds of the motor 333.

<Step S232>

In step S232, the control portion 5 determines whether or not the stop condition is satisfied.

For example, the control portion 5 determines that the stop condition is satisfied when a temperature detected by the temperature sensor 39 after a predetermined specific time period elapses since the driving speed of the motor 333 is changed in step S231, is higher than a temperature that is obtained by subtracting the third threshold from a temperature detected by the temperature sensor 39 when the driving speed of the motor 333 was changed.

Here, upon determining that the stop condition is satisfied (Yes side at S232), the control portion 5 moves the process to step S25. In addition, upon determining that the stop condition is not satisfied (No side at S232), the control portion 5 ends the drive restriction process.

With the above-described configuration, in a case where the temperature of the bearing 333D does not decrease after the driving speed of the motor 333 is changed from the first speed to the second speed, it is possible to reduce the temperature of the bearing 333D by stopping the driving of the motor 333. For example, in a case where the difference between the second speed and the reference speed is small, the temperature of the bearing 333D may not decrease even after the driving speed of the motor 333 is changed.

It is noted that in the drive restriction process, the processes of steps S22, S23, S231 and S232 may be omitted. In addition, in the drive restriction process, the process of step S232 may be omitted. Furthermore, in the drive restriction process, the processes of steps S22, S23, and S24 may be omitted. In that case, the control portion 5 executes the process of step S231 after the process of step S21. In addition, in that case, the specific time period in the stop condition is at least a time period that is longer than a time period required to output a print.

<Step S24>

In step S24, the control portion 5 determines whether or not one or more prints have been output in the print process for which the execution instruction was input in step S11.

Here, upon determining that one or more prints have been output in the print process (Yes side at S24), the control portion 5 moves the process to step S25. In addition, upon determining that one or more prints have not been output in the print process (No side at S24), the control portion 5 waits for a print to be output at step S24.

<Step S25>

In step S25, the control portion 5 stops the driving of the motor 333. Here, the processes of steps S24 and S25 are executed by the first drive control portion 56 of the control portion 5.

This stops the rising of the temperature of the bearing 333D, and the temperature of the bearing 333D decreases by natural cooling. Accordingly, this makes it possible to eliminate the abnormal state.

Here, in the image forming apparatus 10, when the abnormal state is detected, the driving of the motor 333 is stopped after at least one print is output. This makes it possible to avoid the print process from being suspended without outputting a print. It is noted that the process of step S24 may be executed after the process of step S14 and before the process of step S15 in the abnormality detection process. In addition, in the drive restriction process, the process of step S24 may be omitted.

<Step S26>

In step S26, the control portion 5 determines whether or not the condition for resuming the driving is satisfied.

For example, when the wait time has elapsed since the driving of the motor 333 was stopped, the control portion 5 determines that the condition for resuming the driving is satisfied.

Here, upon determining that the condition for resuming the driving is satisfied (Yes side at S26), the control portion 5 moves the process to step S27. In addition, upon determining that the condition for resuming the driving is not satisfied (No side at S26), the control portion 5 waits for the condition for resuming the driving to be satisfied at step S26.

<Step S27>

In step S27, the control portion 5 resumes the driving of the motor 333.

It is noted that in the drive restriction process, the processes of steps S22 to S27 and step S232 may be omitted. In addition, in the drive restriction process, the processes of steps S22 to S27 and steps S231 to S232 may be omitted.

As described above, in the image forming apparatus 10, in a case where the motor 333 is driven at the first speed higher than the reference speed, detection of the abnormal state is performed based on an atmospheric temperature detected at a position located within the first range from the bearing 333D, wherein the abnormal state is a state where the temperature of the bearing 333D has exceeded the allowable temperature. On the other hand, in a case where the motor 333 is driven at the second speed that is lower than the reference speed, detection of the abnormal state is not performed. With this configuration, it is possible to improve the degree of freedom in arrangement position of the temperature sensor 39 that is used to detect the abnormal temperature of the bearing 333D. As a result, in the image forming apparatus 10, it is possible to use the temperature sensor 39 for other purposes such as setting the developing bias voltage.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A laser scanning device comprising:
   a light source;
   a rotary polygon configured to scan light emitted from the light source;
   a motor configured to rotate the rotary polygon;
   a bearing rotatably supporting a rotation shaft of the motor; and
   a detection processing portion configured to, in a case where the motor is driven at a first speed that is higher than a predetermined reference speed, perform detection of an abnormal state based on an atmospheric temperature detected at a position located within a predetermined first range from the bearing, and in a case where the motor is driven at a second speed that is lower than the reference speed, not perform the detection of the abnormal state, wherein the abnormal state is a state where the temperature of the bearing has exceeded a predetermined allowable temperature, wherein
   the detection processing portion detects the abnormal state in a case where a temperature rise rate of the atmospheric temperature has exceeded a predetermined threshold.

2. An image forming apparatus comprising:
   the laser scanning device according to claim 1.

3. The image forming apparatus according to claim 2, further comprising:
   a first drive control portion configured to, in a case where the detection processing portion has detected the abnormal state, stop driving of the motor until a predetermined condition for resuming the driving of the motor is satisfied.

4. The image forming apparatus according to claim 3, further comprising:
   a second drive control portion configured to drive the motor when a print process for forming an image on a sheet is executed, wherein
   in a case where the detection processing portion has detected the abnormal state, the first drive control portion stops the driving of the motor after at least one print is output.

5. The image forming apparatus according to claim 3, further comprising:
   a second drive control portion configured to change a driving speed of the motor from the first speed to the second speed in a case where the detection processing portion has detected the abnormal state, wherein
   the first drive control portion stops the driving of the motor in a case where the driving speed of the motor is not changed to the second speed by the second drive control portion.

6. The image forming apparatus according to claim 5, wherein
   the second drive control portion changes the driving speed to the second speed in accordance with a user operation received after the detection processing portion has detected the abnormal state.

7. The image forming apparatus according to claim 5, wherein
   the first drive control portion stops the driving of the motor when a predetermined stop condition is satisfied after the second drive control portion changes the driving speed.

8. The image forming apparatus according to claim 2, further comprising:
   a first drive control portion configured to change a driving speed of the motor from the first speed to the second speed in a case where the detection processing portion has detected the abnormal state.

9. The image forming apparatus according to claim 2, further comprising:
   a housing storing the rotary polygon, the motor, and the bearing;
   a blower fan configured to generate an airflow that moves along an outer surface of the housing;

a first rotation control portion configured to rotate the blower fan at a predetermined first blowing speed; and
a second rotation control portion configured to rotate the blower fan at a second blowing speed that is higher than the first blowing speed in a case where the detection processing portion has detected the abnormal state.

10. The image forming apparatus according to claim 2, further comprising:
a developing portion haivng a developing roller configured to supply toner to an image carrier, and configured to develop an electrostatic latent image formed on the image carrier;
a temperature sensor disposed at a position located within the first range from the bearing and between the laser scanning device and the developing portion, and configured to detect a temperature at the position where the temperature sensor is disposed; and
a setting processing portion configured to set a voltage to be applied to the developing roller, based on the temperature detected by the temperature sensor, wherein
the detection processing portion performs detection of the abnormal state based on the temperature detected by the temperature sensor.

11. An image forming apparatus comprising:
a laser scanning device including:
a light source;
a rotary polygon configured to scan light emitted from the light source;
a motor configured to rotate the rotary polygon;
a bearing rotatably supporting a rotation shaft of the motor; and
a detection processing portion configured to, in a case where the motor is driven at a first speed that is higher than a predetermined reference speed, perform detection of an abnormal state based on an atmospheric temperature detected at a position located within a predetermined first range from the bearing, and in a case where the motor is driven at a second speed that is lower than the reference speed, not perform the detection of the abnormal state, wherein the abnormal state is a state where the temperature of the bearing has exceeded a predetermined allowable temperature;
a first drive control portion configured to, in a case where the detection processing portion has detected the abnormal state, stop driving of the motor until a predetermined condition for resuming the driving is satisfied; and
a second drive control portion configured to change a driving speed of the motor from the first speed to the second speed in a case where the detection processing portion has detected the abnormal state, wherein
the first drive control portion stops the driving of the motor in a case where the driving speed of the motor is not changed to the second speed by the second drive control portion.

12. The image forming apparatus according to claim 11, wherein
the second drive control portion changes the driving speed to the second speed in accordance with a user operation received after the detection processing portion has detected the abnormal state.

13. The image forming apparatus according to claim 11, wherein
the first drive control portion stops the driving of the motor when a predetermined stop condition is satisfied after the second drive control portion changes the driving speed.

14. The image forming apparatus according to claim 11, wherein
the detection processing portion detects the abnormal state in a case where the atmospheric temperature has exceeded a predetermined threshold.

15. The image forming apparatus according to claim 11, further comprising:
a third drive control portion configured to drive the motor when a print process for forming an image on a sheet is executed, wherein
in a case where the detection processing portion has detected the abnormal state, the first drive control portion stops the driving of the motor after at least one print is output.

16. The image forming apparatus according to claim 11, further comprising:
a housing storing the rotary polygon, the motor, and the bearing;
a blower fan configured to generate an airflow that moves along an outer surface of the housing;
a first rotation control portion configured to rotate the blower fan at a predetermined first blowing speed; and
a second rotation control portion configured to rotate the blower fan at a second blowing speed that is higher than the first blowing speed in a case where the detection processing portion has detected the abnormal state.

17. The image forming apparatus according to claim 11, further comprising:
a developing portion having a developing roller configured to supply toner to an image carrier, and configured to develop an electrostatic latent image formed on the image carrier;
a temperature sensor disposed at a position located within the first range from the bearing and between the laser scanning device and the developing portion, and configured to detect a temperature at the position where the temperature sensor is disposed; and
a setting processing portion configured to set a voltage to be applied to the developing roller, based on the temperature detected by the temperature sensor, wherein
the detection processing portion performs detection of the abnormal state based on the temperature detected by the temperature sensor.

18. An image forming apparatus comprising:
a laser scanning device including:
a light source;
a rotary polygon configured to scan light emitted from the light source;
a motor configured to rotate the rotary polygon;
a bearing rotatably supporting a rotation shaft of the motor; and
a detection processing portion configured to, in a case where the motor is driven at a first speed that is higher than a predetermined reference speed, perform detection of an abnormal state based on an atmospheric temperature detected at a position located within a predetermined first range from the bearing, and in a case where the motor is driven at a second speed that is lower than the reference speed, not perform the detection of the abnormal state, wherein the abnormal state is a state where the temperature of the bearing has exceeded a predetermined allowable temperature;

a developing portion having a developing roller configured to supply toner to an image carrier, and configured to develop an electrostatic latent image formed on the image carrier;

a temperature sensor disposed at a position located within the first range from the bearing and between the laser scanning device and the developing portion, and configured to detect a temperature at the position where the temperature sensor is disposed; and a setting processing portion configured to set a voltage to be applied to the developing roller, based on the temperature detected by the temperature sensor, wherein the detection processing portion performs detection of the abnormal state based on the temperature detected by the temperature sensor.

19. The image forming apparatus according to claim 18, wherein the detection processing portion detects the abnormal state in a case where the atmospheric temperature has exceeded a predetermined threshold.

20. The image forming apparatus according to claim 18, further comprising:

a first drive control portion configured to, in a case where the detection processing portion has detected the abnormal state, stop driving of the motor until a predetermined condition for resuming the driving is satisfied.

* * * * *